(12) United States Patent
Zhu et al.

(10) Patent No.: US 12,390,721 B2
(45) Date of Patent: Aug. 19, 2025

(54) IMPLEMENTING AN HTML5-BASED MOTION SENSING GAME

(71) Applicant: Shenzhen Shimi Network Technology Co., Ltd., Guangdong (CN)

(72) Inventors: Wei Zhu, Guangdong (CN); Jun Li, Guangdong (CN)

(73) Assignee: Shenzhen Shimi Network Technology Co., Ltd., Shenzhen (CN)

( * ) Notice: Subject to any disclaimer, the term of this patent is extended or adjusted under 35 U.S.C. 154(b) by 351 days.

(21) Appl. No.: 18/138,150

(22) Filed: Apr. 24, 2023

(65) Prior Publication Data

US 2023/0415035 A1 Dec. 28, 2023

(30) Foreign Application Priority Data

Jun. 22, 2022 (CN) .......................... 202210709081.7

(51) Int. Cl.
*A63F 13/335* (2014.01)
*A63F 13/428* (2014.01)

(52) U.S. Cl.
CPC .......... *A63F 13/335* (2014.09); *A63F 13/428* (2014.09)

(58) Field of Classification Search
CPC .... A63F 13/335; A63F 13/428; A63F 13/211; A63F 13/48; A63F 13/35; A63F 13/77

USPC .......................................................... 463/42
See application file for complete search history.

(56) References Cited

U.S. PATENT DOCUMENTS

| 11,422,671 | B2 * | 8/2022 | Mildrew | ............... G06F 3/0482 |
| 11,436,806 | B1 * | 9/2022 | Katz | ..................... A61B 5/7425 |
| 2022/0001279 | A1 * | 1/2022 | Colenbrander | ....... H04L 67/131 |
| 2022/0040573 | A1 * | 2/2022 | Fear | ..................... A63F 13/493 |
| 2022/0172426 | A1 * | 6/2022 | Lissi | ....................... G06T 19/00 |

FOREIGN PATENT DOCUMENTS

KR 102317301 B1 * 10/2021

* cited by examiner

Primary Examiner — Michael A Cuff

(57) ABSTRACT

A method for implementing an HTML5-based motion sensing game includes: in response to determining, upon a client is started, that a main program of the HTML5-based motion sensing game is not buffered locally in a user terminal, the client establishing web-view communication with the main program in a server; the client obtaining user's motion pose data from the user terminal and converting the motion pose data into a game operation instruction based on a preset algorithm; the client sending the game operation instruction to the server for execution thereof; the client buffering the main program from the server to the user terminal locally while accessing the main program in the server; and in response to determining that the buffering of the main program cache is completed, the client disconnecting from the server and accessing the main program locally to send the game operation instruction thereto.

20 Claims, 3 Drawing Sheets

IMPLEMENTING AN HTML5-BASED MOTION SENSING GAME

CROSS-REFERENCE TO RELATED APPLICATION

This application claims the benefit of priority of Chinese Patent Application No. 202210709081.7, filed on Jun. 22, 2022, the disclosure of which is incorporated herein by reference in its entirety.

TECHNICAL FIELD

The present application relates to motion sensing game technologies, and more particularly, to implementation of an HTML5-based motion sensing game.

BACKGROUND

Conventionally, to implement a motion sensing game, a game client needs to be installed on a user terminal. After the game client is started, the user's motion sensing data is acquired and sent to a specific software for analysis, so that operation of the motion sensing game can be implemented.

This implementation has a problem that the user has to wait for downloading of the game client, resulting in poor user experience. In addition, the game client may have certain requirements for the operation system of the user terminal and cannot run on various user terminals, resulting in poor game adaptability.

SUMMARY

In view of the above, an embodiment of the present application provides a method for implementing an HTML5-based motion sensing game, including:
  in response to determining, upon a client is started, that a main program of the HTML5-based motion sensing game is not buffered locally in a user terminal, the client establishing web-view communication with the main program in a server;
  the client obtaining user's motion pose data from the user terminal and converting the motion pose data into a game operation instruction based on a preset algorithm;
  the client sending the game operation instruction to the server for execution thereof;
  the client buffering the main program from the server to the user terminal locally while accessing the main program in the server; and
  in response to determining that the buffering of the main program cache is completed, the client disconnecting from the server and accessing the main program locally to send the game operation instruction thereto.

Another embodiment of the present application provides a device for implementing an HTML5-based motion sensing game, including a processor, and a memory storing thereon a client executable by the processor to perform the above method for implementing the HTML5-based motion sensing game.

Another embodiment of the present application provides a computer-readable storage medium, having stored thereon a client executable by the processor to perform the above method for implementing the HTML5-based motion sensing game.

DETAILED DESCRIPTION

Figure 1:
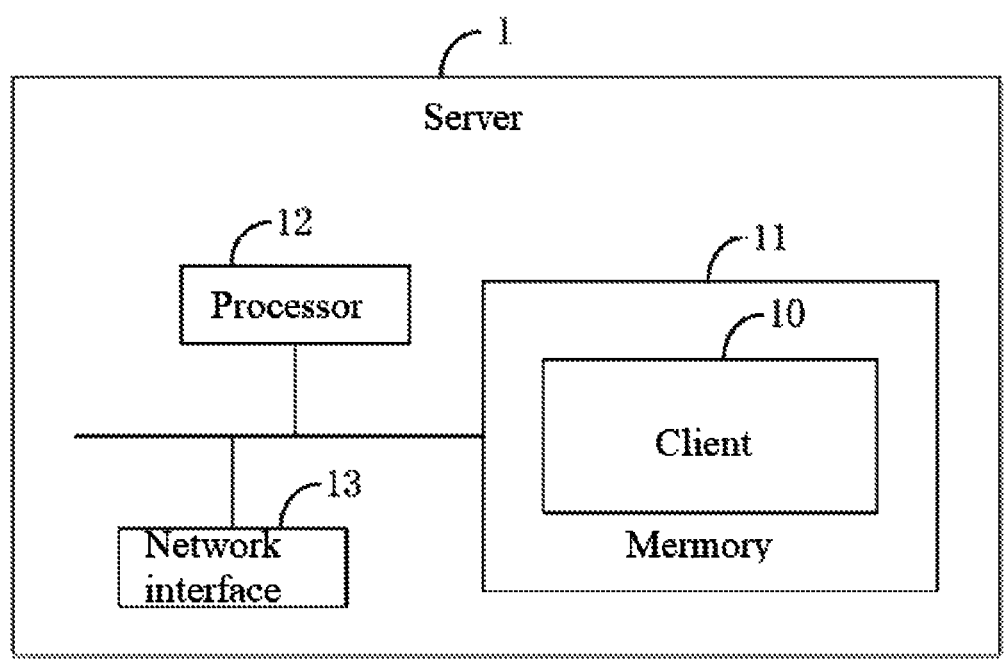
FIG. 1 is a block diagram of a device for implementing an HTML5-based motion sensing game according to an embodiment of the present application.

It should be understood that some embodiments described here are only used to explain the present application, and are not used to limit the present application.

For a better understanding of the above technical solutions, exemplary embodiments of the present application will be described in more detail below with reference to the accompanying drawings. While exemplary embodiments of the present application are shown in the drawings, it should be understood that the present application may be implemented in various forms and should not be limited to the embodiments set forth herein. Rather, these embodiments are provided to enable a more thorough understanding of the present application and to convey the scope of the present application to those skilled in the art as a whole.

It should be noted that in the claims, any reference signs placed between parentheses shall not be construed as limiting the claim. "Containing" present herein does not exclude elements or steps not listed in the claims. The quantifier "a" or "an" preceding a component does not exclude the existence of more than one such component. The present application may be implemented by means of hardware comprising several distinct components and by means of a suitably programmed computer. In the unit claims enumerating several means, several of these means may be specifically embodied by the same item of hardware. The use of "first", "second", and "third", etc. does not indicate any order and can be interpreted as names.

As shown in FIG. 1, which is a block diagram of a server 1 (also called an HTML5-based motion sensing game device) in a hardware operating environment involved in an embodiment of the present application.

The server of the embodiment of the present application can be a device having a display function, such as, "an Internet of Things device", an intelligent air conditioner with networking function, an intelligent lamp, an intelligent power supply, an Augmented Reality (AR)/Virtual Reality (VR) device with a networking function, an intelligent sound box, autonomous vehicles, a tablet computer, an electronic book reader, or the like.

As shown in FIG. 1, the server 1 includes a memory 11, a processor 12, and a network interface 13.

The memory 11 includes at least one type of readable storage medium including a flash memory, a hard disk, a multimedia card, a card-type memory (for example, an Secure Digital (SD) or Data (DX) memory), a magnetic memory, a magnetic disk, an optical disk, or the like. In some embodiments, the memory 11 may be an internal storage unit of the server 1, such as a hard disk of the server 1. In other embodiments, the memory 11 may also be an external storage device of the server 1, such as a plug-in hard disk, a Smart Media Card (SMC), an SD card, a Flash Card, or the like provided on the server 1.

Further, the memory 11 may also include an internal storage unit of the server 1 as well as an external storage device. The memory 11 may be used to not only store the application software installed in the server 1 and various types of data, such as codes of the client (i.e., the HTML5- based motion sensing game program) 10, but also temporarily store data that has been output or to be output.

In some embodiments, the processor 12 may be a Central Processing Unit (CPU), a controller, a microcontroller, a microprocessor or other data processing chip for running program codes or processing data stored in the memory 11, such as executing the client (i.e., the HTML5-based motion sensing game program) 10 or the like.

The network interface 13 may optionally include a standard wired interface and a wireless interface (e.g., a WI-FI interface), typically used to establish a communication connection between the server 1 and other electronic devices.

The network may be an Internet, a cloud network, a Wi-Fi network, a personal network (PAN), a local area network (LAN), and/or a metropolitan area network (MAN). Various devices in a network environment may be configured to be connected to a communication network in accordance with various wired and wireless communication protocols. Examples of such wired and wireless communication protocols may include, but not be limited to, at least one of Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, Li☐Fi, 802.16, IEEE 802.11s, IEEE802.11g, multi-hop communication, wireless access point (AP), device-to-device communication, cellular communication protocol, and/or Bluetooth communication protocol, or combinations thereof.

Alternatively, the server may also include a user interface, which may include a display, an input unit such as a Keyboard, and an optional user interface may also include a standard wired interface and a wireless interface. Alternatively, in some embodiments, the display may be an LED display, a liquid crystal display, a touch-sensitive liquid crystal display, an Organic Light☐Emitting Diode (OLED) touch device, or the like. The display may also be referred to as a display screen or a display unit for displaying information processed in the server 1 and for displaying a user interface for visualization.

FIG. 1 shows only a server 1 having components 11-13 and a client 10, it should be understood by those skilled in the art that the structure shown in FIG. 1 does not constitute a limitation on the server 1, and may include fewer or more components than shown, or some combination of components, or different arrangements of components.

In the embodiment, the processor 12 may be used to invoke the client stored in the memory 11 to perform the following operations: in response to determining, upon a client is started, that a main program of the HTML5-based motion sensing game is not buffered locally in a user terminal, the client establishing web-view communication with the main program in a server; the client obtaining user's motion pose data from the user terminal and converting the motion pose data into a game operation instruction based on a preset algorithm; the client sending the game operation instruction to the server for execution thereof; the client buffering the main program from the server to the user terminal locally while accessing the main program in the server; and in response to determining that the buffering of the main program cache is completed, the client disconnecting from the server and accessing the main program locally to send the game operation instruction thereto.

In an embodiment, the processor 12 may be used to invoke the client stored in the memory 11 to perform the following operations: in response to determining that a preset game picture is to be displayed, the client disconnecting from the server and accessing the main program locally to display the preset game picture.

In an embodiment, the processor 12 may be used to invoke the client stored in the memory 11 to perform the following operations: the client disconnecting from the server and calling the main program accessed in a background of the user terminal to a foreground of the user terminal to display the preset game picture.

In an embodiment, the processor 12 may be used to invoke the client stored in the memory 11 to perform the following operations: the client pre-loading the preset game picture to a memory of the user terminal while accessing the main program in the background of the user terminal; and the client loading the preset game picture directly from the memory to display the preset game picture.

In an embodiment, the processor 12 may be used to invoke the client stored in the memory 11 to perform the following operations: the client loading a preset transition content before the preset game picture is displayed.

In an embodiment, the processor 12 may be used to invoke the client stored in the memory 11 to perform the following operations: in response to determining, upon the client is started, that the main program is buffered locally in the user terminal and determining that a version number of the locally buffered main program is inconsistent with that of the main program in the server, updating the locally buffered main program to a version of the main program in the server.

In an embodiment, the processor 12 may be used to invoke the client stored in the memory 11 to perform the following operations: after disconnecting from the server, the client storing user information and user's game information locally.

Based on a hardware architecture of the device for implementing the HTML5-based motion sensing game described above, an embodiment of the method for implementing the HTML5-based motion sensing game of the present application is proposed. The method for implementing the HTML5-based motion sensing game of the present application aims to improve the game experience of a user and the adaptability of the motion sensing game.

Figure 2:
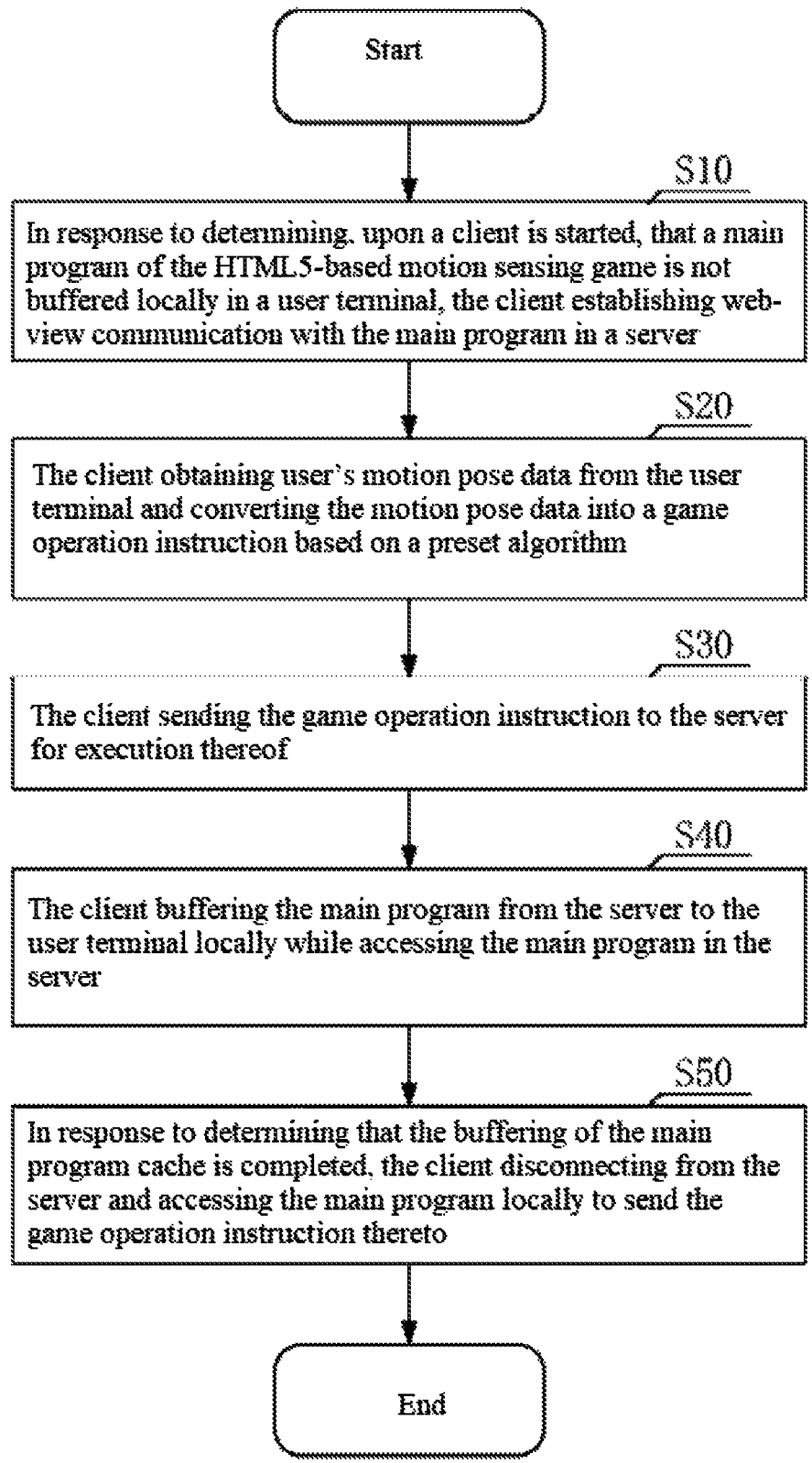
FIG. 2 is a flow diagram of a method for implementing an HTML5-based motion sensing game according to an embodiment of the present application.
Figure 3:
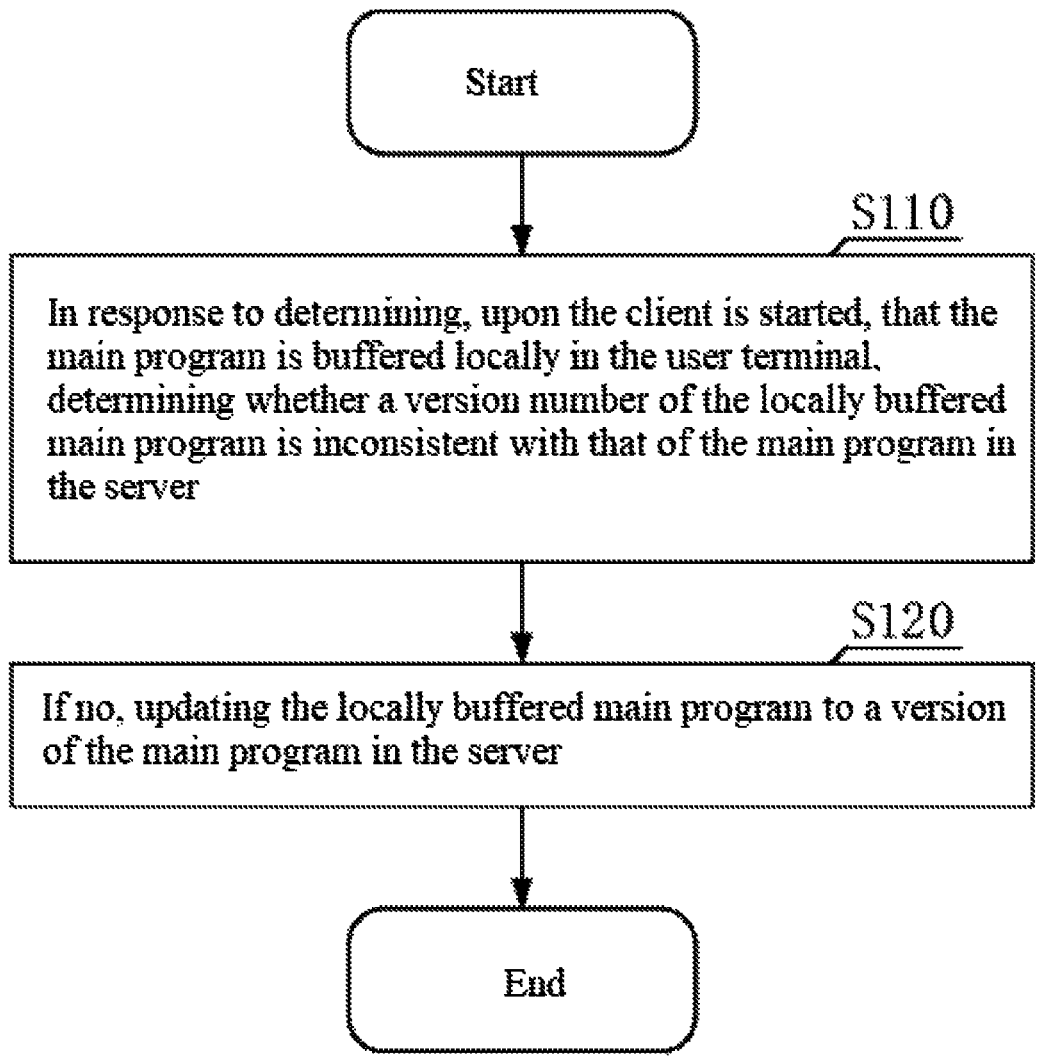
FIG. 3 is a flow diagram of a method for implementing an HTML5-based motion sensing game according to another embodiment of the present application.

Referring to FIG. 2, which is a flow diagram of an embodiment of a method for implementing an HTML5-based motion sensing game of the present application. The method for implementing the HTML5-based motion sensing game includes the following steps.

S10 of in response to determining, upon a client is started, that a main program of the HTML5-based motion sensing game is not buffered locally in a user terminal, the client establishing web-view communication with the main program in a server.

The user terminal refers to a terminal such as a personal computer (PC), a mobile terminal, a game host, and a portable host.

HTML5 is a language description for constructing Web content. HTML5 is a specification of the HyperText Markup Language (HTML) as a core language in the Web. The content seen by the user when browsing a web page using any means is originally in the HTML format, and is converted into identifiable information by some technical processing in the browser.

Web-view refers to a web page view, which may be embedded in a mobile terminal for hybrid development of the front end.

The client refers to an application program installed on the user terminal. Generally, when the user terminal is a mobile terminal, the client generally refers to an APP on the mobile terminal.

Specifically, after the client is started by the user, the client performs self-inspection of the application program. In this case, if the main program is not locally buffered in the user terminal, it is indicated that the client on the user terminal is started the first time and the desired motion sensing game is not locally buffered. In this case, the main program on the server can be accessed through a web-view component built in the client. The content of the server can be displayed by the web-view component on the display screen of the user terminal.

S20 of the client obtaining user's motion pose data from the user terminal and converting the motion pose data into a game operation instruction based on a preset algorithm.

Specifically, the user's motion pose data refers to the acquired pose data of the user's actions, which generally includes three-axis acceleration data and three-axis gyroscope data. After motion pose data of the user is obtained via the client, the motion pose data can be converted into the game operation instruction based on the preset algorithm. Specifically, the client may perform data resolution on the motion pose data of the user through the Euler angle algorithm to obtain a motion space track of the user, and further obtain a corresponding motion sensing game operation instruction according to the motion space track of the user.

In some embodiment, the user terminal obtains the user's motion pose data from a motion sensing device in communication connection with the user terminal.

With this design, not only the calculation pressure of the user terminal can be reduced, but also the specific motion sensing device can contribute to improving an acquisition accuracy of the user motion pose data, so as to improve an operation accuracy of the game. Illustratively, the motion sensing device may be a device, such as a hand ring, a glove watch, a headscarf, a hat, a vest, a fitness ring, a game handle, or the like. In addition to motion detection, the motion sensing device defined in the technical solution of the present application also needs to have a communication connection function to establish a communication connection with the user terminal. The communication connection may be a wireless connection (for example, a Bluetooth connection or a Wi-Fi connection), or may be a wired connection (for example, a USB data connection).

It should be noted that the design of the present application is not limited thereto. In other embodiments, if the user terminal itself has an Inertial Measurement Unit (IMU) sensor, the client may also directly obtain motion pose data from the user terminal.

S30 of the client sending the game operation instruction to the server for execution thereof.

Specifically, after a corresponding game operation instruction is calculated by the client, the client may send the corresponding game operation instruction to the server based on the communication protocol (usually the TCP/IP protocol) with the server. After the corresponding game operation instruction is received by the server, the server executes the game operation instruction to play the game.

It should be noted that a preset algorithm for converting the game operation instruction is embedded in the client. When the game operation instruction needs to be converted, the client can invoke calculation power of the user terminal to obtain the required game operation instruction. In this case, the game operation instruction is converted by the client, so that the amount of data from the client to the server can be reduced, thereby reducing the delay from the client to the server.

S40 of the client buffering the main program from the server to the user terminal locally while accessing the main program in the server.

Specifically, the main program is locally buffered from the server to the user terminal while the client is accessing the main program of the server.

S50 of in response to determining that the buffering of the main program cache is completed, the client disconnecting from the server and accessing the main program locally to send the game operation instruction thereto, where the client sends the game operation instruction to the locally buffered main program when the client accesses the locally buffered main program.

Specifically, after the main program is buffered locally, the client disconnects the web-view communication with the server and establishes the web-view communication with the locally buffered main program. In this case, the client directly sends the game operation instruction to the locally buffered main program, which is equivalent to directly executing the game locally instead of playing the cloud game. In this way, the user game is not terminated even if the client is disconnected from the server, and the network signal strength of the user terminal does not affect the game experience of the user.

Since the client can convert the motion pose data of the user into the game operation instruction, the game operation instruction can be directly obtained without the server.

It should be understood that, according to the method for implementing the HTML5-based motion sensing game of the technical solutions of the present application, when there is no corresponding motion sensing game in the user terminal, the client can directly access a HTML5-based motion sensing game main program on the server, so that the user can still play the game when the main program is not buffered in the client. Meanwhile, when the client accesses the server, the main program can be buffered locally to the user terminal via the client. After the buffering of the main program is completed, the client can be disconnected from the server and accesses the locally buffered main program, so that the user can play the game locally on the user terminal. In the above manner, the user not only can play the game in real time, but also can play the game locally after the buffering of the main program is completed, so as to prevent the game experience from being affected by the network. It can be seen that, compared with the conventional motion sensing game method, the method for motion sensing game of the present application has the advantages of playing the game at any time, not being affected by the network, and better user experience. In addition, since the HTML5 has the advantage of not being limited by the operation system, the method for motion sensing game of the present application also has the advantage of better adaptability.

In some embodiments, the client disconnecting from the server and accessing the main program locally may include: in response to determining that a preset game picture is to be displayed, the client disconnecting from the server and accessing the main program locally to display the preset game picture.

The preset game picture refers to a picture in which the user does not need to perform frequent game operations, such as an end picture of a current game checkpoint, a selection picture of a game checkpoint, a game main interface, or like.

Specifically, the client may determine whether the preset game picture is to be displayed according to the current game picture. For example, when the current game checkpoint enters a final stage, the client may determine whether the preset game picture is to be displayed in the game. Alternatively, the client may determine whether the preset game picture is to be displayed in the game according to a logical frame of the motion sensing game (where the logical frame of the game is usually faster than a rendering frame of the game, so it may be determined whether the preset game picture is to be displayed in the game according to the logical frame).

Specifically, when it is determined that the preset game picture is to be displayed in the game, the client can be disconnected from the server and access the locally buffered main program to display the preset game picture. In this way, it is possible to ensure the normal operation of the current game picture and to seamlessly switch the client to the locally buffered main program.

It should be noted that the design of the present application is not limited to thereto. In other embodiments, when the buffering of the main program is completed, the client accesses the locally buffered main program at the next time the user plays the game.

In some embodiment, the client disconnecting from the server and accessing the main program locally to display the preset game picture may include: the client disconnecting from the server and calling the main program accessed in a background of the user terminal to a foreground of the user terminal to display the preset game picture.

Specifically, since the locally buffered main program accessed in the background does not need to play an actual game, computing resources are not occupied too much, so that the game experience of the user is not affected. Further, the switching of the client to the locally HTML5-based motion sensing game main program accessed in the background can be completed at the first time when the client is switched to the locally buffered main program, so that the user's waiting time and stuck feeling of the switching can be reduced, and the user experience can be improved.

In some embodiment, the client disconnecting from the server and accessing the main program locally to display the preset game picture may further include: the client preloading the preset game picture to a memory of the user terminal while accessing the main program in the background of the user terminal; and the client loading the preset game picture directly from the memory to display the preset game picture.

Specifically, after the client successfully establishes communication with the locally buffered main program in the background, the client can directly access the preset game content. In this way, the preset game picture can be preloaded in a memory of the user terminal. As such, when the client is switched to the locally buffered main program, the locally buffered main program can be directly invoked from the background to the foreground, and the preset game picture can be directly refreshed, so that the stuck feeling of switching an object accessed via the client can be further reduced, thereby improving the use experience of the user.

In some embodiment, the client disconnecting from the server and accessing the main program locally to display the preset game picture may further include: the client loading a preset transition content before the preset game picture is displayed.

Specifically, when the current game picture is ended and the client determines that the preset game picture is to be refreshed, the client may load a segment of preset transition content, which may be preset animation, preset still picture, or the like.

It can be understood that the user cannot perceive that the object accessed via the client access is switched by loading the preset transition content, and the game experience of the user can be improved. In some embodiments, the method for implementing the HTML5-based motion sensing game further includes:

S110 of in response to determining, upon the client is started, that the main program is buffered locally in the user terminal, determining whether a version number of the locally buffered main program is inconsistent with that of the main program in the server; and S120 of in response to determining that the version number of the locally buffered main program is inconsistent with that of the main program in the server, updating the locally buffered main program to a version of the main program in the server.

Specifically, after the client is started, the client first establishes a communication connection with the server. After the client successfully establishes the communication connection with the server, the client can compare whether a version number of the locally buffered main program is consistent with that of the main program on the server, so as to determine whether the locally buffered main program is the latest version. If the version number of the locally buffered main program is inconsistent with that of the main program on the server, it can be illustrated that the locally buffered main program is not the latest version. In this case, the main program of the latest version can be buffered locally from the server to update the locally buffered main program. Of course, after updating of the locally buffered main program is completed, the user can normally play the game.

In some embodiments, the method for HTML5-based motion sensing game of the present application may further include: after disconnecting from the server, the client storing user information and user's game information locally.

By the above setting, the user's personal information and game information are stored locally to protect the user's privacy. In subsequently playing the game, the user information and game information stored on the client can be used directly without uploading them to the server. Of course, if the user needs to replace the user terminal, the client may also provide an interface for the cloud backup information.

In addition, another embodiment of the present application further provides a computer-readable storage medium, which may be any one or any combination of a hard disk, a multimedia card, an SD card, a flash memory card, an SMC, a read-only memory (ROM), an erasable programmable read-only memory (EPROM), a portable compact disk read-only memory (CD-ROM), a USB memory, or the like. The client (i.e., HTML5-based motion sensing game program) 10 is stored in the computer-readable storage medium. A specific embodiment of the computer-readable storage medium of the present application is substantially the same as the specific embodiment of the method for HTML5-based motion sensing game and the server 1, and details thereof are not repeatedly described herein.

It should be appreciated by those skilled in the art that embodiments of the present application may be provided as a method, a system, or a computer program product. Thus, the present application may take the form of a full hardware embodiment, a full software embodiment, or an embodiment incorporating both software and hardware. Moreover, the present application may take the form of a computer program product embodied on one or more computer usable storage media (including, but not limited to, magnetic disk memory, CD-ROM, optical memory, etc.) having computer usable program code embodied therein.

The present application is described with reference to flow diagram and/or block diagram of the method, the device (the system), and the computer program product according to the embodiments of the present application. It should be understood that each flow and/or block in the flow diagram and/or block diagram, and combinations of flow and/or block in the flow diagram and/or block diagram may be implemented by computer program instructions. These computer program instructions may be provided to processors of a general purpose computer, a special purpose computer, an embedded processor, or other programmable data processing device to produce a machine such that the instructions executed by the processor of the computer or other programmable data processing device produce means for implementing the functions specified in one or more flows of the flow diagram and/or one or more blocks of the block diagram.

These computer program instructions may also be stored in a computer-readable memory capable of directing a computer or other programmable data processing apparatus to operate in a particular manner, such that the instructions stored in the computer-readable memory produce an article of manufacture including instruction means that perform the functions specified in one or more flows of the flow diagram and/or one or more blocks of the block diagram.

These computer program instructions may also be loaded onto a computer or other programmable data processing device such that a series of operational steps are performed on the computer or other programmable device to produce a computer-implemented process, such that the instructions that are executed on the computer or other programmable device provide steps for implementing the functions specified in one or more flows of the flow diagram and/or one or more blocks of the block diagram.

Although some embodiments of the present application have been described, those skilled in the art will be able to make additional changes and modifications to these embodiments as soon as the basic inventive concept is known. Accordingly, the appended claims are intended to be interpreted as including the embodiments and all changes and modifications that fall within the scope of the present application.

It should be apparent to those skilled in the art that various modifications and variations can be made to the embodiments of the present application without departing from the spirit and scope of the present application. Such modifications and variations are intended to fall within the scope of the appended claims and their equivalents.

What is claimed is:

1. A method for implementing an HTML5-based motion sensing game, comprising:
   in response to determining, upon a client is started, that a main program of the HTML5-based motion sensing game is not buffered locally in a user terminal, the client establishing web-view communication with the main program in a server;
   the client obtaining user's motion pose data from the user terminal and converting the motion pose data into a game operation instruction based on a preset algorithm;
   the client sending the game operation instruction to the server for execution thereof;
   the client buffering the main program from the server to the user terminal locally while accessing the main program in the server; and
   in response to determining that the buffering of the main program cache is completed, the client disconnecting from the server and accessing the main program locally to send the game operation instruction thereto.

2. The method of claim 1, wherein the client disconnecting from the server and accessing the main program locally comprises:
   in response to determining that a preset game picture is to be displayed, the client disconnecting from the server and accessing the main program locally to display the preset game picture.

3. The method of claim 2, wherein the client disconnecting from the server and accessing the main program locally to display the preset game picture comprises:
   the client disconnecting from the server and calling the main program accessed in a background of the user terminal to a foreground of the user terminal to display the preset game picture.

4. The method of claim 3, wherein the client disconnecting from the server and accessing the main program locally to display the preset game picture further comprises:
   the client pre-loading the preset game picture to a memory of the user terminal while accessing the main program in the background of the user terminal; and
   the client loading the preset game picture directly from the memory to display the preset game picture.

5. The method of claim 3, wherein the client disconnecting from the server and accessing the main program locally to display the preset game picture further comprises:
   the client loading a preset transition content before the preset game picture is displayed.

6. The method of claim 4, wherein the client disconnecting from the server and accessing the main program locally to display the preset game picture further comprises:
   the client loading a preset transition content before the preset game picture is displayed.

7. The method of claim 1, further comprising:
   in response to determining, upon the client is started, that the main program is buffered locally in the user terminal and determining that a version number of the locally buffered main program is inconsistent with that of the main program in the server, updating the locally buffered main program to a version of the main program in the server.

8. The method of claim 1, further comprising:
   after disconnecting from the server, the client storing user information and user's game information locally.

9. The method of claim 1, wherein the motion pose data is obtained by the user terminal from a motion sensing device in communication connection with the user terminal.

10. A device for implementing an HTML5-based motion sensing game, comprising a processor, and a memory storing thereon a client executable by the processor to perform operations comprising:
    in response to determining, upon the client is started, that a main program of the HTML5-based motion sensing game is not buffered locally in a user terminal, the client establishing web-view communication with the main program in a server;
    the client obtaining user's motion pose data from the user terminal and converting the motion pose data into a game operation instruction based on a preset algorithm;

the client sending the game operation instruction to the server for execution thereof;

the client buffering the main program from the server to the user terminal locally while accessing the main program in the server; and in response to determining that the buffering of the main program cache is completed, the client disconnecting from the server and accessing the main program locally to send the game operation instruction thereto.

11. The device of claim 10, wherein the client disconnecting from the server and accessing the main program locally comprises:

in response to determining that a preset game picture is to be displayed, the client disconnecting from the server and accessing the main program locally to display the preset game picture.

12. The device of claim 11, wherein the client disconnecting from the server and accessing the main program locally to display the preset game picture comprises:

the client disconnecting from the server and calling the main program accessed in a background of the user terminal to a foreground of the user terminal to display the preset game picture.

13. The device of claim 12, wherein the client disconnecting from the server and accessing the main program locally to display the preset game picture further comprises:

the client pre-loading the preset game picture to a memory of the user terminal while accessing the main program in the background of the user terminal; and the client loading the preset game picture directly from the memory to display the preset game picture.

14. The device of claim 12, wherein the client disconnecting from the server and accessing the main program locally to display the preset game picture further comprises:

the client loading a preset transition content before the preset game picture is displayed.

15. The device of claim 10, wherein the operations further comprise:

in response to determining, upon the client is started, that the main program is buffered locally in the user terminal and determining that a version number of the locally buffered main program is inconsistent with that of the main program in the server, updating the locally buffered main program to a version of the main program in the server.

16. A computer-readable storage medium having stored thereon a client executable by a processor to perform operations comprising:

in response to determining, upon the client is started, that a main program of the HTML5-based motion sensing game is not buffered locally in a user terminal, the client establishing web-view communication with the main program in a server;

the client obtaining user's motion pose data from the user terminal and converting the motion pose data into a game operation instruction based on a preset algorithm;

the client sending the game operation instruction to the server for execution thereof;

the client buffering the main program from the server to the user terminal locally while accessing the main program in the server; and in response to determining that the buffering of the main program cache is completed, the client disconnecting from the server and accessing the main program locally to send the game operation instruction thereto.

17. The computer-readable storage medium of claim 16, wherein the client disconnecting from the server and accessing the main program locally comprises:

in response to determining that a preset game picture is to be displayed, the client disconnecting from the server and accessing the main program locally to display the preset game picture.

18. The computer-readable storage medium of claim 17, wherein the client disconnecting from the server and accessing the main program locally to display the preset game picture comprises:

the client disconnecting from the server and calling the main program accessed in a background of the user terminal to a foreground of the user terminal to display the preset game picture.

19. The computer-readable storage medium of claim 18, wherein the client disconnecting from the server and accessing the main program locally to display the preset game picture further comprises:

the client pre-loading the preset game picture to a memory of the user terminal while accessing the main program in the background of the user terminal; and the client loading the preset game picture directly from the memory to display the preset game picture.

20. The computer-readable storage medium of claim 18, wherein the client disconnecting from the server and accessing the main program locally to display the preset game picture further comprises:

the client loading a preset transition content before the preset game picture is displayed.

* * * * *